N. PEARSON.
TONGS.
APPLICATION FILED MAR. 14, 1913.

1,070,286.

Patented Aug. 12, 1913.

WITNESSES

INVENTOR
Nels Pearson
BY
ATTORNEYS

UNITED STATES PATENT OFFICE.

NELS PEARSON, OF OGEMA, WISCONSIN.

TONGS.

1,070,286.  Specification of Letters Patent.  Patented Aug. 12, 1913.

Application filed March 14, 1913.  Serial No. 754,220.

*To all whom it may concern:*

Be it known that I, NELS PEARSON, a citizen of the United States, and a resident of Ogema, in the county of Price and State of Wisconsin, have invented a new and Improved Tongs, of which the following is a full, clear, and exact description.

This invention relates to tongs for use in skidding logs during lumbering operations, and for other like purposes, and has reference more particularly to tongs which comprise a pair of pivotally-connected legs, a head, an operative connection between the head and each of the legs, and means whereby the free ends of the legs are normally pressed toward each other.

The object of the invention is to provide simple, strong and durable tongs for use in logging and other operations, in which the legs and the hooks or claw-points thereof may be of any suitable size or shape, in which the tong legs are normally pressed toward each other at their free ends, so that they will grip a log or other object which they engage regardless of whether or not the pull upon the tongs is maintained, which will therefore not become accidentally displaced from the object to which they are applied if the pull upon the tongs should cease for any reason whatsoever, which, however, can be easily disengaged when so desired, which can be inexpensively manufactured, and which are light in weight and compact in form.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1:
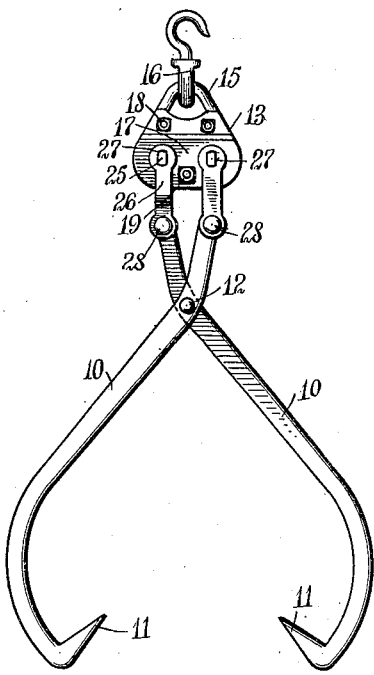
Figure 2:
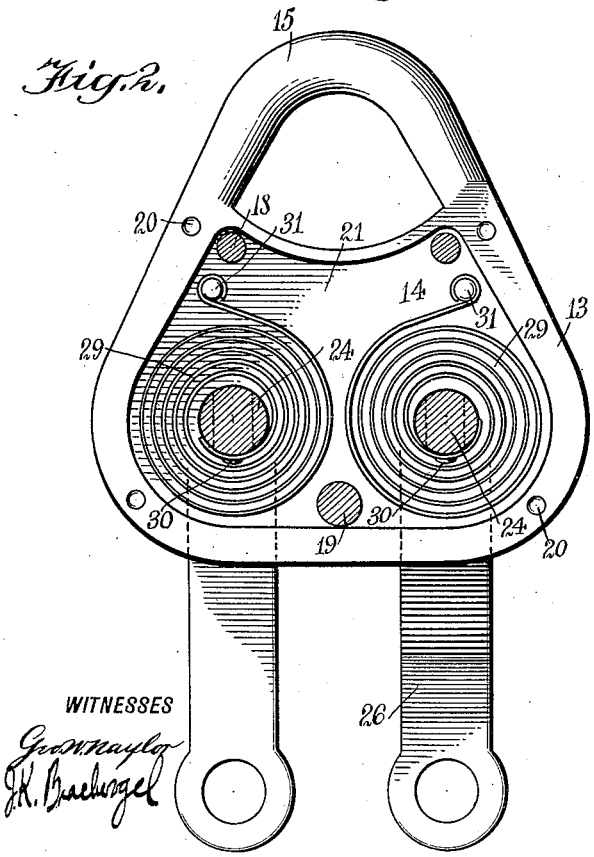
Figure 3:
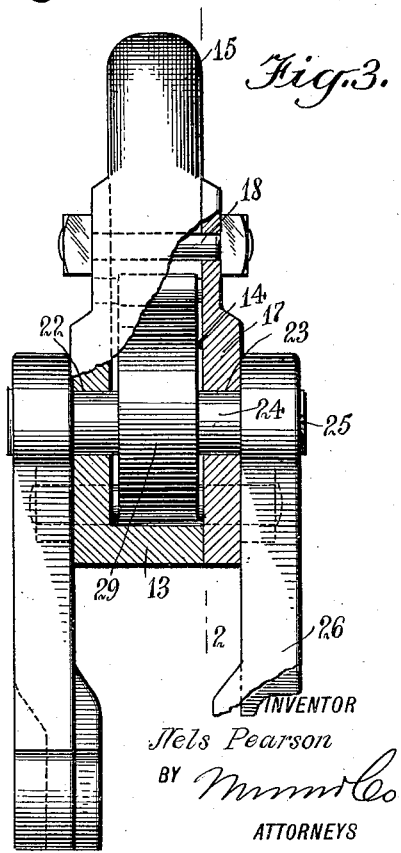

Figure 1 is a side elevation of a pair of tongs constituting an embodiment of my invention; Fig. 2 is an enlarged vertical section of the head of the tongs on the line 2—2 of Fig. 3; and Fig. 3 is a fragmentary vertical section of the head of the tongs.

Before proceeding to a more detailed explanation of my invention it should be clearly understood that, while the tongs can be employed for different purposes, they are particularly useful in logging operations in which logs or timbers are skidded, that is to say, are dragged by animal power from one place to another. In the skidding operation a pair of tongs is applied to the log and pull exerted upon the swivel hook at the front of the tongs. This pull causes the two legs of the tongs at their free ends to approach each other and thus grip the object to which they are applied. If, for any reason, the pull is relaxed, the tongs cease to grip and fall off the object being skidded, particularly in a case of peeled or frozen timber, or small logs. Naturally, if the skidding operation is not completed it is then necessary again to apply the tongs by hand to the log, and this necessarily entails loss of time and annoyance. My invention provided tongs in which the grip is resiliently maintained under all conditions, so that, when the pull is relaxed, the tong will not fall from the object. However, whenever it is necessary to release the tongs, this can be readily accomplished.

Referring more particularly to the drawings, I have shown, for example, a pair of tongs having legs 10 fashioned from suitable metal and of the usual bowed form. Each leg has at the lower end a claw-point or hook 11 of the customary shape. The legs are crossed near the upper ends and pivotally connected by means of a rivet 12. I provide a housing or head 13 of substantially triangular form and having a suitable chamber 14 therein. The head has an eye 15 integral or otherwise rigidly associated therewith and serving for the attachment of the usual swiveled hook 16. By means of the latter the chain or other line by means of which the pull is exerted upon the tongs is attached thereto. The housing has a removable face plate 17 conforming in shape to the housing and normally closing or covering the chamber 14 therein. This plate is secured in position by means of bolts 18 and 19, which pass through registering openings provided therefor in the housing and the plate. This housing has along its edge projections 20 adapted to be received in suitable recesses of the face plate to assist in properly positioning the parts relative to one another and to aid the bolts in securing them together.

The back 21 of the housing opposite the face plate 17 is provided with a pair of openings 22 therethrough which register with a pair of corresponding openings 23 in the face plate. Arbors 24 are journaled in these openings which serve as bearings, and project beyond the housing at both sides thereof. The projecting ends 25 of the arbors have the opposite sides flattened and fit into correspondingly-shaped openings 27 of pairs of links 26, the latter being at their lower ends movably connected by means of rivets 28, or screw bolts with the upper ends of the legs 10, so that each of the legs is connected with the head by one of the pairs of links 26 supported by an arbor 24. It will be understood that, when the pull is exerted upon the head, the links 26 and the upper ends of the legs tend to straighten out in the manner of toggles, to cause the free ends of the legs to approach each other and grip any object between them.

Located in the housing is a pair of coiled springs 29, each one of which is disposed about one of the arbors 24, and is secured thereto by means of a screw 30, or in any other suitable manner. The opposite or outer end of each spring is fastened to a stud 31 carried by the back 21 of the casing. The springs are so disposed that they tend to hold the arbors in normal positions, the arbors in turn holding the links in position such that the hooked ends of the legs are maintained comparatively close together, and so that any movement to force the free ends of the hooks apart will be resiliently resisted. In other words, the springs tend normally to press the hooked ends of the tong legs toward each other, and to maintain them in normal position.

Having thus described my invention, I claim as new and desire to secure by Letters Patent:

1. Tongs comprising a pair of pivotally connected crossed legs; a head having pivots; links on said pivots connecting said legs and said head; and a spring on each pivot tending to maintain the legs in normal positions.

2. Tongs comprising a pair of pivotally connected crossed legs; a head; links connecting the said legs and said head; a spring in said head connected directly to said links and tending to maintain said legs in normal positions.

3. Tongs comprising a pair of pivotally connected crossed legs, a head, links connecting the said legs and said head, and springs directly associated with said head and each of said legs and tending to hold said legs in normal positions.

4. Tongs comprising a hollow head, arbors journaled in said head, springs in said head and secured thereto and to said arbors, links rigidly connected with said arbors, and crossed, pivotally connected legs each pivotally connected with one of said links.

5. Tongs comprising a hollow head, arbors journaled in said head and extending beyond the opposite sides thereof, pairs of links each rigidly secured to the projecting ends of one of said arbors, a pair of crossed, pivotally connected legs each pivotally connected with one of said pairs of links, and coiled springs located in said head about said arbors, and each secured to one of said arbors and to said head.

In testimony whereof I have signed my name to this specification in the presence of two subscribing witnesses.

NELS PEARSON.

Witnesses:
 ERNST A. HEDEN,
 CARL H. HEDEN.

---

Copies of this patent may be obtained for five cents each, by addressing the "Commissioner of Patents, Washington, D. C."